United States Patent [19]

Martin

[11] Patent Number: 4,729,423

[45] Date of Patent: Mar. 8, 1988

[54] PROCESS AND APPARATUS FOR THE OPTICAL CHECKING OF THE SHAPE AND DIMENSIONS OF THE ENDS OF TUBES IN A STEAM GENERATOR

[75] Inventor: Alain Martin, Caluire, France

[73] Assignee: Framatome, Courbevoie, France

[21] Appl. No.: 808,701

[22] Filed: Dec. 13, 1985

[30] Foreign Application Priority Data

Dec. 14, 1984 [FR] France ............................ 84 19210

[51] Int. Cl.⁴ ...................... G01C 11/00; G03B 35/00
[52] U.S. Cl. ........................................ 165/1; 165/11.1; 165/11.2; 376/248; 376/249
[58] Field of Search ............... 376/248, 249; 165/11.1, 165/11 A, 1, 11.2; 358/100

[56] References Cited

U.S. PATENT DOCUMENTS

| | | | |
|---|---|---|---|
| 4,205,940 | 6/1980 | Golick | 165/11 A |
| 4,255,762 | 5/1981 | Takeyasu et al. | 376/248 |
| 4,302,772 | 11/1981 | Gillot | 376/248 |
| 4,347,652 | 9/1982 | Cooper, Jr. et al. | 165/11 A |
| 4,503,506 | 3/1985 | Sturges, Jr. | 358/100 |
| 4,515,747 | 5/1982 | Greek et al. | 376/249 |
| 4,521,844 | 6/1985 | Sturges, Jr. et al. | 376/249 |

FOREIGN PATENT DOCUMENTS

| | | | |
|---|---|---|---|
| 0071977 | 2/1983 | European Pat. Off. | 376/248 |
| 3023050 | 1/1982 | Fed. Rep. of Germany | 376/248 |
| 3306449 | 8/1983 | Fed. Rep. of Germany . | |
| 2398583 | 2/1979 | France . | |

OTHER PUBLICATIONS

Engineer, vol. 228, No. 5912, 5/15/69, pp. 42–43, Arnstein, "Photogrammetry Extends to Industry".

*Primary Examiner*—Salvatore Cangialosi
*Attorney, Agent, or Firm*—Pollock, Vande Sande & Priddy

[57] ABSTRACT

The process consists in displacing a camera (15), provided with a sensitive support, parallel to the tubular plate (2) of the steam generator inside the water tank (3), successively taking photographs of the primary face (2a) of the tubular plate (2), making from the sensitive support, extracted from the water tank (3), pairs of photographic images of the ends of the tubes (8) flush with the tubular plate (2) with different angles of perspective, orienting the photographic images of the pairs in relation to one another to obtain a stereophotogrammetric view of the end of each of the tubes (8) to be checked, and making measurements and observations on the stereophotogrammetric view. The invention also relates to checking apparatus comprising a camera arrangement movable inside the water tank.

3 Claims, 4 Drawing Figures

PROCESS AND APPARATUS FOR THE OPTICAL CHECKING OF THE SHAPE AND DIMENSIONS OF THE ENDS OF TUBES IN A STEAM GENERATOR

FIELD OF THE INVENTION

The invention relates to a process and an apparatus for optically checking the shape and dimensions of the ends of steam generator tubes.

BACKGROUND OF THE INVENTION

Steam generators of pressurized water nuclear reactors contain a nest of tubes which are bent into U shape and whose ends are fixed in a tubular plate of great thickness and lie flush with one face of this tubular plate constituting the primary face coming into contact with the pressurized water. Beneath the tubular plate the distribution of the primary pressurized water in the tubes and the recuperation of this primary water are effected inside a water tank which has a hemispherical shape and is divided into two parts by a vertical partition. This water tank has an opening for the admission of the pressurized water and an opening for the evacuation of water which has circulated in the tubes situated on each side of the partition. This water tank also has at least one manhole for the inspection, maintenance and repair of the steam generator.

Steam generators of pressurized water nuclear reactors must operate over very long periods of time, and it may be necessary to make repairs to some tubes which may have cracked after a certain period of use in the steam generator. In order to locate with certainty the tubes which have become cracked, it may be necessary to introduce in these tubes an eddy current or ultrasonic probe, which will require a minimum diameter for its passage through the tube.

Tube ends near the primary face of the tubular plate may be deformed and bent inwards through the action of impacts of migrant bodies or particles transported by the pressurized water during its circulation at high speed in the vessel of the nuclear reactor and in the steam generator. The ends of the tubes very slightly project from the primary face of the tubular plate, and these projecting ends are liable to become deformed. The ability to introduce a probe into the tube may then be reduced.

On the other hand, it is possible either to repair cracked tubes by a lining operation, or to put the cracked tube out of action by sealing its end lying flush with the tubular plate with the aid of a stopper of a special design.

Finally, when the repair or stopping operations have been completed, it is necessary to check that these operations have been correctly carried out.

For these multiple operations of checking, repair or stopping, it is necessary to introduce tools or auxiliary parts into the tube. The ability to introduce such equipment is reduced when the tube ends are deformed.

Before a checking or repair operation on the tubes of a steam generator, it is therefore necessary to know the shape and dimensions of the hole for passage through the tubes in the proximity of the primary face of the tubular plate.

In steam generators which have been in operation, it is scarcely conceivable to make this inspection directly and visually, because the water tank of the steam generator will have undergone heavy radioactive contamination.

A simple examination by a video system would not provide sufficiently accurate information, and it would be necessary to devote a very long time to the optical examination of the thousands of steam generator tubes inside the water tank.

The use of photographic images of the different parts of the tubular plate and of the ends of the tubes would likewise not make it possible to ascertain with great accuracy the shape of the tubes and the passage diameter inside them.

SUMMARY OF THE INVENTION

The invention therefore seeks to propose a process for the optical checking of the shape and dimensions of the ends of the tubes of a steam generator comprising a nest of tubes whose ends are fixed in a tubular plate and lie flush with one face of said tubular plate, or primary face, and a water tank of hemispherical shape having at least one opening in its wall, the interior space of said tank being in communication with the primary face of the tubular plate and with the interior of the tubes, this checking process making it possible to obtain an exact image of the end of the tubes and an accurate measurement of their inside passage diameter, without subjecting personnel to prolonged exposure to the radiation of the primary part of the steam generators.

To this end:

a photographic camera provided with a sensitive support is placed parallel to the tubular plate, inside the water tank, in such a manner that its optical axis remains substantially parallel to a fixed direction during the displacement, exposures are made in succession of the primary face of the tubular plate with the camera in different positions, so as to obtain at least two views at different angles of each of the tubes which have to be checked, with the aid of the sensitive support extracted from the water tank photographic images are made on a determined fixed scale of the primary face of the tubular plate and of the ends of the tubes, the photographic images are oriented and arranged in pairs so as to obtain stereophotogrammetric views of the ends of each of the tubes which are to be checked, and measurements and observations are made on the stereophotogrammetric view obtained for each of the tubes, outside the zone of the steam generator.

BRIEF DESCRIPTION OF THE DRAWINGS

In order that the invention may be more clearly understood, a description will now be given, as a nonlimitative example and with reference to the accompanying drawings, of one embodiment of the process according to the invention and also of the apparatus used for making the photographs inside the water tank of a pressurized water steam generator.

FIG. 1 shows the bottom part of a steam generator whose outer casing 1 is connected by means of the tubular plate 2 to a water tank 3 of hemispherical shape. The water tank 3 is divided into two parts by a vertical partition 5.

Figure 1:
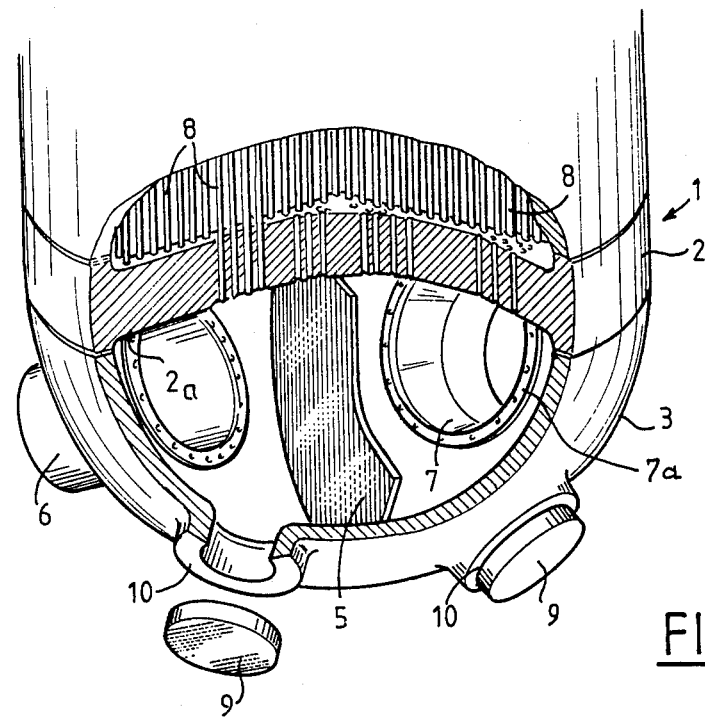
FIG. 1 is an exploded view in perspective of the bottom part of a steam generator of a pressurized water nuclear reactor.

Each of the two parts of the water tank has an opening 7 of large dimensions, on which is fixed a connector 6 enabling the steam generator to be connected to the primary circuit of the reactor. Inside the water tank 3, closure rings 7a are disposed around the openings 7 in order to permit the fastening of a leaktight closure stopper during certain operations of intervention in the water tank 3. One of the connectors 6 is connected to the hot branch of of the primary circuit loop in which the steam generator 1 is situated, i.e., the branch of the circuit through which the high-temperature pressurized water arrives from the reactor vessel, while the other connector 6 is connected to the cold branch of the primary circuit loop, i.e., the branch of that circuit which makes it possible to return the cooled primary water in the steam generator to the reactor vessel.

In addition, each part of the water tank 3 is provided with an inspection opening or manhole 10 closed by a cover 9 and permitting the passage of an operator and/or of equipment for inspection, maintenance or repair of the steam generator.

The tubular plate 2 is provided with thousands of holes into which are expanded the ends of the tubes 8 of the nest of tubes occupying the top part of the steam generator 1 above the plate 2.

Each of the tubes 8 is bent into U shape at the top (not shown). Each tube of the nest is fixed to the tubular plate by one of its ends, on one side of the partition 5, and by its other end on the other side of the partition 5.

In this way, the high temperature pressurised water penetrating into the water tank in the hot part of the latter, and distributed by the tubular plate in all the tubes of the nest, circulates over the entire length of these tubes and passes out in the second or cold part of the water tank 3.

The feed water of the steam generator comes into contact with the outer wall of the tubes in that part of the steam generator which is situated above the tubular plate 2. The feed water is heated and vaporized by the heat of the pressurized water transported by the tubes 8.

The tubes 8 are expanded into the interior of the tubular plate 2, which is of great thickness, and generally project very slightly from the bottom or primary face 2a which comes into contact with the pressurized water of the steam generator 1.

These ends of the tubes 8, which are substantially flush with the face 2a of the tubular plate 2, are subjected to impacts of particles of small dimensions carried by the pressurized water circulating in the hot part of the water tank at very high speed. The ends of the tubes 8 may thus be deformed, so that the passage diameter of the tube may be much smaller than its nominal diameter after the steam generator has been operating for a certain time.

It is necessary to check very accurately the condition of the ends of the tubes 8, particularly in the hot part of the tubular plate.

Figure 2:
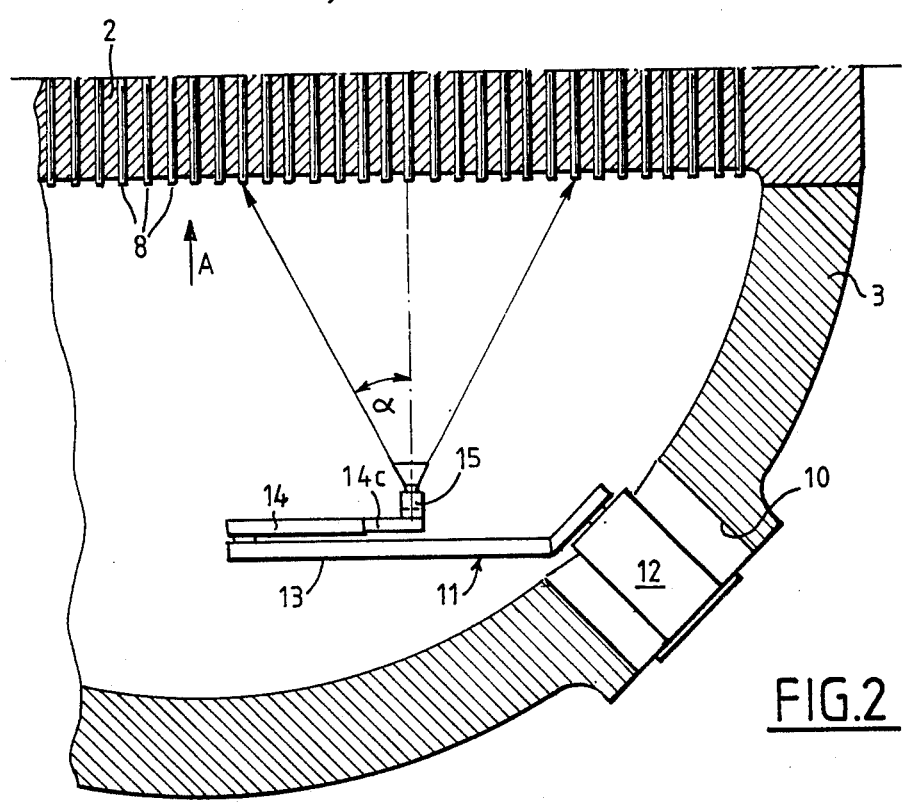
FIG. 2 is a view in section through a vertical plane of a part of the water tank of the steam generator shown in FIG. 1, inside which tank the camera arrangement is in the working position.

FIG. 2 shows a part of the water tank 3 of a steam generator provided with a manhole, into the interior of which is introduced an arrangement for photographing the tubular plate, this arrangement being given the general reference 11.

The camera arrangement 11, which will be described in greater detail with reference to FIG. 3, comprises a fastening member 12 attached to the edges of the manhole 10 through which the camera arrangement 11 penetrates into the water tank 3, a horizontal fixed arm 13 and a likewise horizontal movable arm 14 carrying at its end the actual camera 15.

The camera 15 is a wide angle camera fixed to the end of the arm 14 in such a manner that its optical axis is substantially vertical and containing a sensitive support placed in a horizontal plane, i.e., parallel to the face 2a of the tubular plate which is to be checked.

The camera 15 has the optical properties required to enable it to be used as a measuring chamber. This camera makes it possible to obtain slight distortions and limited chromatic aberrations. Its focal length, corresponding to the distance between its focal point and the plane of the sensitive surface, is very acurately defined and known; the lens elements have excellent alignment and planenesses and perpendicularities are respected with very great accuracy inside the camera.

The sensitive surface is a fine grain emulsion film; use is for example made of professional films having a sensitivity of 4 ASA.

Cameras of this kind serving as measuring chambers exist on the market, and the construction of the camera arrangement shown in FIG. 2 is reduced to the fastening of a camera 15 of this kind on the end of the movable arm of a displacement means such as will be described with reference to FIG. 3.

Before the camera arrangement 11 is placed in position inside the water tank 3, a light source (not shown) was introduced through the opening 10 into the hot part of the water tank 3 and placed in position in such a manner as to illuminate the entire face 2a of the tubular plate situated on the hot side of the partition 5.

Figure 3:
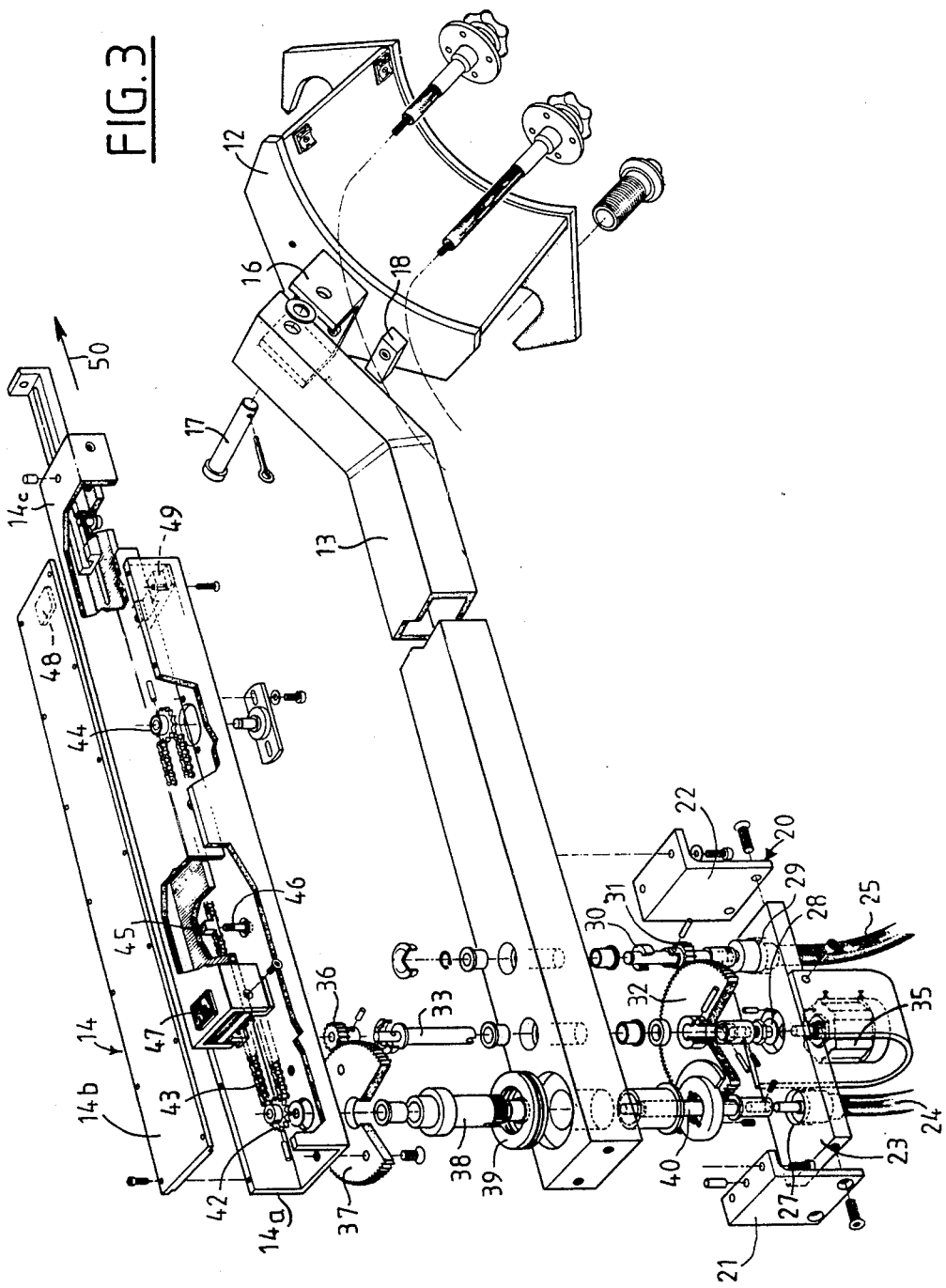
FIG. 3 is an exploded view in perspective of the assembly comprising the means of displacing the camera.

Referring to FIG. 3, this Figure shows the assembly permitting the displacement of the camera 15 inside the water tank 3 after it has been introduced through the manhole 10.

The fastener 12 is made in the form of a stirrup, which is engaged on the edge of the manhole and fixed thereon while still allowing free passage through this manhole 10. A U-shaped lug 16 is fixed on the stirrup 12 and is provided with holes to receive a pivot pin 17 for the end of the arm 13, which can thus be adjusted in the vertical direction.

A shim 18, on which the portion of the arm close to the pivot rests, makes it possible to adjust the position of the longitudinal portion of the fixed arm 13 in such a manner that this portion will be perfectly horizontal inside the water tank 3. The arm 13 is composed of two profiled parts of rectangular section, connected together in such a manner that their axes form a certain angle.

At the end of the fixed arm 13 opposite that end which is pivoted on the fastener 12 is screwed a motor assembly 20 provided with two fastening brackets 21 and 22, together with a support frame 23. On the support frame are fixed the drive motors 24 and 25 for the movable arm 14, and also bearings 27, 28 and 29 receiving the shafts of the motors and the drive shafts of the pinions of the device displacing the arm 14.

This device comprises the output shaft 30 of the motor 25, this shaft being journalled in the bearing 29 and fastened to a pinion 31 meshing with a gear 32 of large diameter. The gear 32 is in turn fastened to a shaft 33 journalled in the bearing 28 and having one end, under the support 23, penetrating into a pickup device 35 making it possible to determine very accurately the angle of rotation of the shaft 33. The top end of the shaft 33 is fastened to a pinion 36 meshing with a gear 37 of large diameter fastened by screws to the movable arm 14 consisting of a channel section 14a closed by a flat cover 14b and containing a movable carriage 14c, likewise in the form of a channel section.

The motor 25 can thus drive the arm 14 rotationally with the aid of shafts and pinions, with a double reduction ratio at the gears 32 and 37. The position of the arm 14 can be known very accurately with the aid of the angle transducer 35.

The top part of the shaft 30 is journalled in the arm 13; the shaft 33 passes through the arm 13, in which it is journalled, its end portion carrying the drive pinion 36.

A hollow shaft 38 is mounted with an easy fit with the aid of rings, such as 39, inside the support 23 and the fixed arm 13. The top of this hollow shaft 38 is fastened to the movable arm 14.

The drive shaft 40 passes through the entire length of the hollow shaft 38 and is fastened to the output of the motor 24, carrying at its top end a chain pinion 42 meshing with a chain 43 passing over a return pinion 44 journalled on the part 14a of the movable arm 14. A stud 45 fastened to the chain comes into engagement with a part of the carriage 14c of the movable arm 14, on which it is fixed by a screw 46. The carriage 14c is mounted for translation inside the U-shaped portion 14a of the movable carriage 14 with the aid of skids, such as 47, of PTFE, producing a guided movement, with minimum friction, of the carriage 14c in the axial direction inside the arm 14.

The cover 14b also carries skids of PTFE, such as 48, for guiding the carriage 14c.

A stop 49 makes it possible to limit the outward movement of the carriage 14c in the direction of the arrow 50, outside the casing constituted by the parts 14a and 14b of the arm 14. The end of the carriage 14c in the outward direction of this carriage always remains outside the casing and carries the camera 15.

The device for the displacement of the carriage 14c makes it possible to place the camera in one or the other of two positions corresponding in the one case to maximum extraction of the carriage 14c outside the casing, and in the other case to maximum retraction of the carriage inside the casing of the movable arm 14.

Thus, the camera will be able to occupy, inside the water tank, a very large number of positions corresponding to the different angles of orientation of the arm 14 and, for each of these angles of orientation, to the either completely extracted or completely retracted position of the carriage 14c.

Each position of the camera, corresponding to a photographing position controlled from outside the water tank, will be characterised by an angle of orientation of the movable arm 14 and by a radius of extension of the arm 14 which may have one or the other of two values.

The device for displacing the camera 15, consisting of the arms 13 and 14, makes it possible to effect a displacement of the camera in such a manner that its optical axis will remain constantly parallel to a fixed direction, this parallelism being achieved with an uncertainty of less than 10°.

After introduction of the support arm into the water tank—an operation which can be carried out very quickly and by extremely simple manipulation—the camera equipped with a sensitive film is mounted on the end of the movable arm, the movements of which are controlled from outside the water tank by an operator, who makes an exposure in each of the positions of the arm in respect of rotation and extension.

In the case of a steam generator of a pressurized water nucleasr reactor at present in service, twenty photographic exposures are thus made in succession of the primary face 2a of the tubular plate and of the ends of the tubes 8, at different angles.

The different positions of the arm 14, which is displaced in a perfectly horizontal plane, are determined in such a manner that the arm can take at least two views of the ends of each of the tubes 8 at very different angles.

The program for the displacement of the arm 14 is thus predetermined so as to scan the entire tubular plate with sufficient overlap.

FIG. 2 shows the camera 15 with an aperture angle which in the position shown makes it possible to photograph a tube 8 whose perspective radius forms an angle with the optical axis of the camera 15. At least a second exposure will be made, at a different perspective angle, of this particular tube 8.

Figure 4:
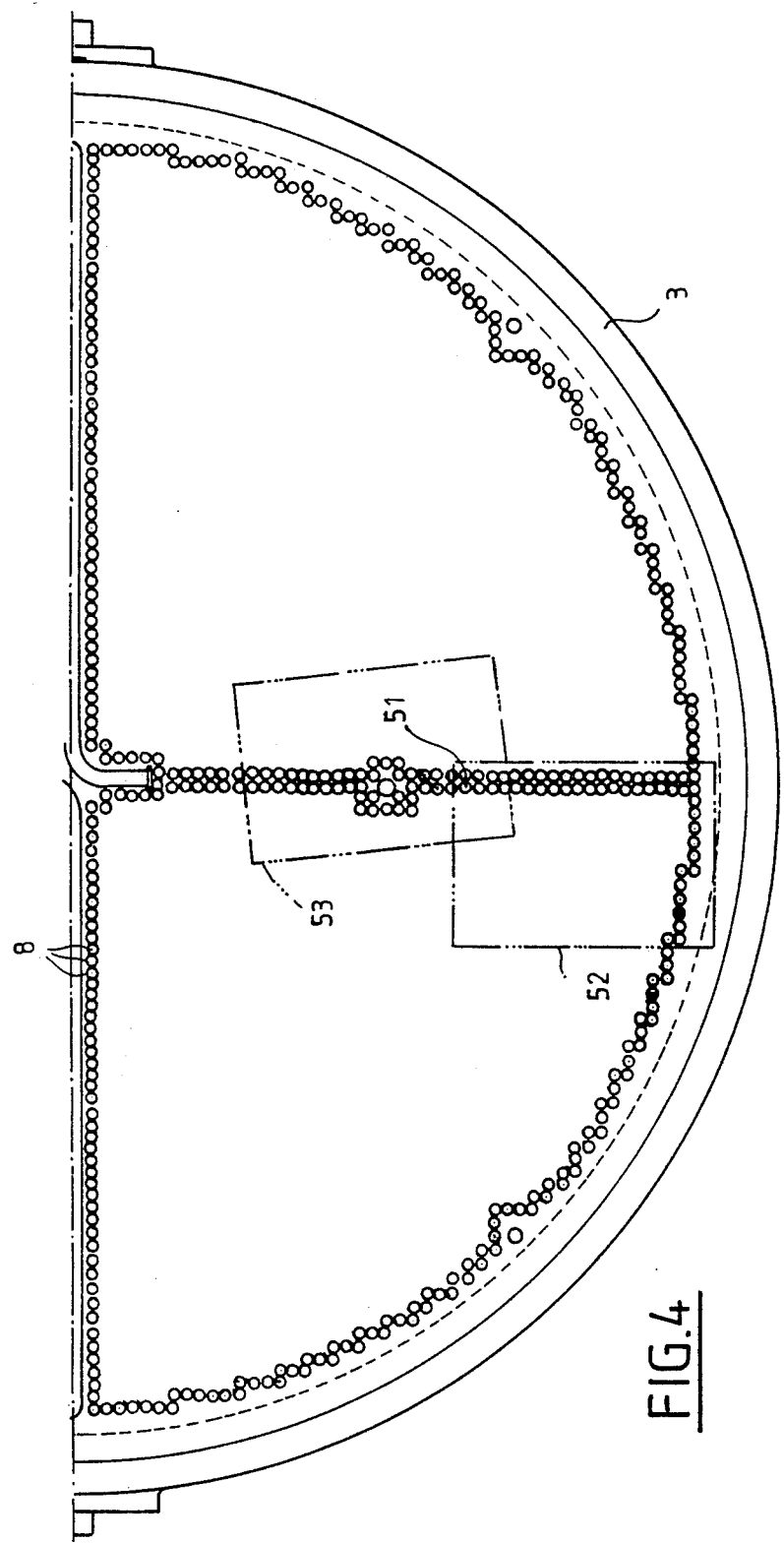
FIG. 4 is a view from below, in the direction of the arrow A in FIG. 2, of a tubular halfplate of the steam generator.

FIG. 4 shows, in the plane of the face 2a of the tubular plate, the position of the ends of tubes 8 and also the contour of zones corresponding to different exposures inside the water tank.

The end 51 of a tube 8 is included both in the exposure zone 52 and in the exposure zone 53.

This tube end 51 will therefore appear in two different views taken with perspective angles which are likewise different.

When all the views of the tubular plate have been taken, the camera 15 is removed in order to extract its sensitive support and to develop the latter, so as to have photographs of the entire face 2a of the tubular plate, corresponding to views of different zones, such as 52 and 53, with a certain overlap. These photographs will be developed and printed in such a manner that the scale of representation of the tubular plate and of the tube ends will be perfectly constant.

The two parameters (angle and extension radius) accurately determining the position of the camera at the moment when the exposure is made are associated with each of the photographs corresponding to an exposure zone such as 52 or 53.

The photographs can be grouped in pairs, each of these pairs of photographs showing an array of tubes, which can be subjected to stereophotogrammetric examination.

It should be observed that the tubes can be perfectly identified in the photographs provided that, in the case of a large number of photographs, at least one of the edges of the plate appears in them. The particular position of the tubes relative to the rounded edge of the tubular plate makes it possible to determine quickly and without ambiguity the position of tubes shown in the photograph.

The tubular plate is in fact in the form of a regular grid in which the coordinates and the positions of the tubes are defined within the grid itself. Similarly, taking into account the measurement of the distance between the tubes situated near a particular tube subjected to stereophotogrammetric examination, it is possible to determine the perspective angle at which this tube is viewed. The distance between the tubes is in fact perfectly constant in the grid of the tubular plate, and this distance is retained, within the accuracy of the scale used, for tubes close to the position of the optical axis of the camera.

The actual stereophotogrammetric examination of the photographs is made with the aid of a known device provided with means for the relative displacement and orientation of these photographs under the remote control of an operator, the superimposed images of these two exposures being received on a screen.

The selection of the pairs of photographs and their relative orientation for each of the tubes may be predetermined because of the accurate knowledge of the position of the camera for each of the exposures and also of the perspective angles for each of the tubes.

For the examination and checking of the dimensions of ends of tubes 8, photogrammetric images are thus available which permit examination of the tubular plate and of these tube ends under very good conditions outside the zone of the steam generator.

The image in relief obtained by the operator permits direct examination of the tube ends and of any deformation that they may have undergone, as well as the measurement of the passage diameter of these tubes.

In order to make the measurements, it is simply necessary to take into account the scale of the restored image, which is particularly easy because details are shown in the image whose real dimensions are very accurately known. For example, the distances between the axes of the tubes, corresponding to the drilling centers of the tubular plate, are known.

The photographs can thus be used for visual examination of each of the tubes and for measurements on the restored image.

The data obtained from the photographs can also be used as input data for a computer program making it possible to obtain and display or record the parameters which are to be checked.

The principal advantages of the process and apparatus according to the invention are that it is possible to make an inspection of the ends of tubes in the tubular plate of a steam generator which has been in operation, without exposing personnel to radiation inside the water tank of the steam generator, to make extremely accurate measurements on these tubes without any limit to the time that can be devoted to these measurements, and to make available to the operating company a set of documents showing the state of the tubular plate of the steam generator at a given moment.

The invention is not limited to the embodiment which has been described.

Thus, it is possible to conceive the utilization of devices for the displacement of the camera which are of a different type from that described, and of a different form of stereophotogrammetric processing of the images obtained.

Stereophotogrammetric examination of the steam generator may be applied to other parts of the latter instead of to the primary face of the tubular plate.

Thus, it is possible to check and record the shapes and dimensions of the manholes of the steam generator in order to adapt the shape and dimensions of the closure covers to these openings in a faultless manner. These parts of the generator in fact undergo deformation through the action of thermal stresses, which have the consequence that the covers provided when the steam generator was built become unsuitable. Similarly, it is possible to make a dimensional check (diameter, drilling dimensions of bolt holes and perpendicularity) and a check on the flatness of the closure ring 7a of the primary pipe connectors, enabling a leaktight closure cover to be fitted thereto, in such a manner as to permit intervention in the water tanks when the power station is shut down, despite the presence of water in the primary piping.

Finally, the invention is applicable to the optical control of any steam generator containing a nest of tubes whose ends lead out onto one face of a tubular plate inside a water tank.

I claim:

1. Process for the stereophotogrammetric checking of the shape and dimensions of the ends of the tubes of a steam generator comprising a bundle of tubes (8) whose ends are fixed in a tubular plate (2) constituting a regular grid in which the positions of said tubes are accurately defined and lie flush with one face of said tubular plate (2), or primary face (2a), and a water tank (3) of hemispherical shape having at least one opening (10) in its wall, the interior space of said tank being in communication with said primary face (2a) of said tubular plate (2) and with the interior of said tubes (8), said process comprising the steps of
   (a) placing a photographic camera (15) provided with a sensitive support parallel to said tubular plate (2), inside said water tank (3), in such a manner that its optical axis remains substantially parallel to a fixed direction during the displacement;
   (b) making successive exposures of the ends of said tube lying flush with said primary face (2a) of said tubular plate (2) with said camera (15) in different determined positions, each exposure corresponding to a plurality of tubes chosen so as to obtain, by the successive exposure made, at least two views at two different perspective angles of each of said tubes (8) to be checked;
   (c) obtaining from said sensitive support extracted from said water tank (3) photographic images on a predetermined fixed scale of said primary face (2a) of said tubular plate (2) and of the ends of said tubes (8),
   (d) determining on each image the perspective angle corresponding to each said tube to be checked by measuring the space between said tubes in the neighborhood of the tubes to be checked and comparing said spacing to the corresponding spacing at the center of the image, each tube being identified in terms of its position in the regular grid of said plate;
   (e) arranging the photographic images in pairs to give a stereophotogrammetric view of the end of each of said tubes (8) to be checked;
   (f) orienting the images of each said pair with respect to each other to obtain a stereophotogrammetric image of each tube;
   (g) determining the scale of the image by measuring the spacing of said tubes on the stereophotogrammetric view and comparing said spacing with the constant spacing of said grid; and
   (h) observing and measuring the ends of each tube on the stereophotogrammetric view, taking the scale into account.

2. Checking process according to claim 1, wherein said camera (15) is displaced in a horizontal plane while its optical axis remains constantly vertical.

3. Checking process according to claim 2, wherein said camera (15) is displaced by successive rotation and translation in the horizontal plane.

* * * * *